US008794970B2

(12) United States Patent
Testrake

(10) Patent No.: US 8,794,970 B2
(45) Date of Patent: Aug. 5, 2014

(54) CONTROL SYSTEMS TO EMULATE JET AIRCRAFT IN RECIPROCATING ENGINE-POWERED TRAINERS

(76) Inventor: Steven G. Testrake, Escondido, CA (US)

( * ) Notice: Subject to any disclaimer, the term of this patent is extended or adjusted under 35 U.S.C. 154(b) by 1991 days.

(21) Appl. No.: 11/376,730

(22) Filed: Mar. 14, 2006

(65) Prior Publication Data

US 2006/0240389 A1 Oct. 26, 2006

Related U.S. Application Data

(60) Provisional application No. 60/662,598, filed on Mar. 16, 2005, provisional application No. 60/661,811, filed on Mar. 14, 2005.

(51) Int. Cl.
*G09B 9/08* (2006.01)
(52) U.S. Cl.
USPC ............... 434/37; 434/29; 434/30; 434/38; 434/45
(58) Field of Classification Search
CPC ........................................................ G09B 9/08
USPC ........................................ 434/30, 37, 38, 45
See application file for complete search history.

(56) References Cited

U.S. PATENT DOCUMENTS

| 3,344,665 | A | * | 10/1967 | Anthony | 73/178 R |
|---|---|---|---|---|---|
| 3,546,350 | A | * | 12/1970 | Reynolds | 434/243 |
| 3,714,825 | A | * | 2/1973 | Melvin | 73/178 T |
| 3,886,334 | A | * | 5/1975 | Cummings et al. | 434/30 |
| 4,233,756 | A | * | 11/1980 | Horwitz | 434/30 |
| 4,276,702 | A | * | 7/1981 | Horwitz | 434/47 |
| 4,280,285 | A |  | 7/1981 | Haas |  |
| 4,281,994 | A |  | 8/1981 | Dell et al. |  |
| 4,357,663 | A | * | 11/1982 | Robbins et al. | 701/5 |
| 4,420,808 | A | * | 12/1983 | Diamond et al. | 701/4 |
| 4,442,491 | A |  | 4/1984 | Olhausen, Jr. |  |
| 4,470,116 | A |  | 9/1984 | Ratchford |  |
| 4,474,501 | A |  | 10/1984 | LaRussa |  |
| 4,490,117 | A | * | 12/1984 | Parker | 434/35 |
| 4,573,925 | A |  | 3/1986 | Styers |  |

(Continued)

OTHER PUBLICATIONS

PowerLink FADEC, "Introducing the most significant innovation to aircraft piston technology in 70 years", Aerosance 2004, p. 1.

(Continued)

*Primary Examiner* — Sam Yao
*Assistant Examiner* — Alvin Carlos
(74) *Attorney, Agent, or Firm* — Kilpatrick Townsend & Stockton LLP

(57) ABSTRACT

This disclosure describes novel aircraft control systems for propeller-driven training aircraft, and methods for their use. In an aspect of some embodiments, a control system might comprise an integrated power control that takes a single power input from the pilot and translates that input into controls for a throttle, a propeller pitch setting, and a fuel/air mixture. In another aspect of some embodiments, a glass cockpit may be provided, with computer displays emulating the instruments of the aircraft for which the pilot is training. Advantageously, this allows a pilot in training to learn, from the beginning, the power controls and/or instrumentation for the aircraft for which the pilot is training, instead of having to learn one power control and instrumentation system, only to later have to learn another system. In a specific embodiment, the instrumentation displays may be reconfigurable, allowing the displays to emulate those of a variety of jet aircraft.

22 Claims, 5 Drawing Sheets

(56) References Cited

U.S. PATENT DOCUMENTS

| | | | |
|---|---|---|---|
| 4,599,070 A * | 7/1986 | Hladky et al. | 434/45 |
| 4,673,356 A * | 6/1987 | Schmidt | 434/35 |
| 4,710,128 A | 12/1987 | Wachsmuth et al. | |
| 4,842,520 A | 6/1989 | Dupont | |
| 5,009,598 A * | 4/1991 | Bennington | 434/30 |
| 5,017,930 A | 5/1991 | Stoltz et al. | |
| 5,058,427 A | 10/1991 | Brandt | |
| 5,161,158 A | 11/1992 | Chakravarty et al. | |
| 5,200,901 A | 4/1993 | Gerstenfeld et al. | |
| 5,240,416 A * | 8/1993 | Bennington | 434/30 |
| 5,260,874 A * | 11/1993 | Berner et al. | 701/33 |
| 5,490,783 A * | 2/1996 | Stephens et al. | 434/35 |
| 5,616,030 A * | 4/1997 | Watson | 434/38 |
| 5,632,622 A | 5/1997 | Bothwell | |
| 5,634,794 A * | 6/1997 | Hildreth et al. | 434/37 |
| 5,807,109 A | 9/1998 | Tzidon et al. | |
| 5,828,987 A | 10/1998 | Tano et al. | |
| 5,839,080 A | 11/1998 | Muller et al. | |
| 5,952,959 A | 9/1999 | Norris | |
| 6,077,077 A | 6/2000 | Geipe | |
| 6,092,008 A | 7/2000 | Bateman | |
| 6,094,607 A | 7/2000 | Diesel | |
| 6,179,618 B1 * | 1/2001 | Stone | 434/30 |
| 6,216,064 B1 | 4/2001 | Johnson et al. | |
| 6,319,008 B1 | 11/2001 | Mickelson et al. | |
| 6,366,836 B1 | 4/2002 | Johnson | |
| 6,430,479 B1 | 8/2002 | Johnson | |
| 6,463,366 B2 | 10/2002 | Kinashi et al. | |
| 6,469,654 B1 | 10/2002 | Winner et al. | |
| 6,477,449 B1 | 11/2002 | Conner et al. | |
| 6,522,298 B1 | 2/2003 | Burgett et al. | |
| 6,529,827 B1 | 3/2003 | Beason et al. | |
| 6,584,384 B2 | 6/2003 | Gremmert et al. | |
| 6,640,165 B1 | 10/2003 | Hayward et al. | |
| 6,684,182 B1 | 1/2004 | Gold et al. | |
| 6,790,041 B2 | 9/2004 | Fountain | |
| 6,879,886 B2 | 4/2005 | Wilkins et al. | |
| 6,915,190 B2 * | 7/2005 | Galasso | 701/14 |
| 7,236,914 B1 | 6/2007 | Zyskowski | |
| 7,337,063 B1 | 2/2008 | Oberg et al. | |
| 2002/0035416 A1 | 3/2002 | De Leon | |
| 2002/0068997 A1 | 6/2002 | Agashe et al. | |
| 2002/0099478 A1 | 7/2002 | Ishihara et al. | |
| 2003/0054324 A1 | 3/2003 | Fountain | |
| 2003/0065428 A1 | 4/2003 | Mendelson et al. | |
| 2003/0171856 A1 | 9/2003 | Wilf | |
| 2005/0055143 A1 | 3/2005 | Doane | |
| 2005/0273220 A1 * | 12/2005 | Humbard et al. | 701/3 |
| 2006/0160049 A1 | 7/2006 | Zora | |
| 2006/0271249 A1 | 11/2006 | Testrake et al. | |
| 2007/0077540 A1 | 4/2007 | Testrake et al. | |

OTHER PUBLICATIONS

PowerLink FADEC, "Technical Specifications", Aerosance 2004, pp. 2.
PowerLink FADEC, "System Overview", Aerosance 2004, pp. 2.
PowerLink FADEC, "Engine Displays", Aerosance 2004, p. 1.
Blue Mountain Avionics—Home Page—2006, 2 pages.
U.S. Appl. No. 11/376,628, filed Mar. 14, 2006, Office Action mailed Apr. 30, 2009, 14 pages.
U.S. Appl. No. 11/486,763, filed Jul. 13, 2006, Office Action mailed May 19, 2009, 13 pages.
U.S. Appl. No. 11/376,628, filed Mar. 14, 2006, Final Office Action mailed Nov. 23, 2009, 20 pages.
U.S. Appl. No. 11/376,628, filed Mar. 14, 2006, Advisory Action mailed Feb. 5, 2010, 3 pages.
U.S. Appl. No. 11/376,628, filed Mar. 14, 2006, Office Action mailed Mar. 29, 2010, 17 pages.
U.S. Appl. No. 11/486,763, filed Jul. 13, 2006, Advisory Action mailed Mar. 25, 2010, 16 pages.
U.S. Appl. No. 11/486,763, filed Jul. 13, 2006, Office Action mailed Jun. 9, 2010, 17 pages.

* cited by examiner

CONTROL SYSTEMS TO EMULATE JET AIRCRAFT IN RECIPROCATING ENGINE-POWERED TRAINERS

CROSS-REFERENCE TO RELATED APPLICATIONS

The present disclosure may be related to the following commonly assigned applications/patents:

This application claims priority from co-pending U.S. Provisional Patent Application No. 60/661,811 filed Mar. 14, 2005 by Testrake et al. and entitled "SGT 200 Flight Training System," which is hereby incorporated by reference, as if set forth in full in this document, for all purposes.

This application claims priority from co-pending U.S. Provisional Patent Application No. 60/662,598 filed Mar. 16, 2005 by Testrake and entitled "SGT-200 A Reciprocating Engine Powered Training Aircraft Which Is Purpose Built to Emulate a Jet (Turbine) Powered Aircraft," the entire disclosure of which is hereby incorporated by reference, for all purposes.

This application is related to co-pending U.S. patent application Ser. No. 11/376,628, filed on a date even herewith by Testrake et al. and entitled "Flight Training System," which is hereby incorporated by reference, as if set forth in full in this document, for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates to aircraft control systems in general and in particular to systems for use in reciprocating engine-powered training aircraft that are designed to emulate jet aircraft.

BACKGROUND OF THE INVENTION

In the field of aircraft training, beginning students typically are trained on small, reciprocating engine-powered (e.g., propeller-driven) aircraft, such as the Cessna 172, Piper Cherokee, and the like. Such aircraft generally have control systems specific to small aircraft. For example, there are usually separate controls for throttle, propeller pitch, fuel/air mixture, and the like. Moreover, many such aircraft have relatively rudimentary instrumentation packages, such as analog, "round-dial" gauges, including an altimeter, artificial horizon, a directional gyro, airspeed indicator, and the like, and typically have a yoke to provide input to the ailerons for directional inputs.

In contrast, turbine-powered (jet) aircraft, in particular military aircraft but also including commercial jets, typically offer a different set of controls for the pilot. For example, turbine technology eliminates the need for the triple controls (throttle, pitch and mixture) required for propeller aircraft, such that a jet cockpit typically provides only a single power control (or, alternatively, one per engine) to provide power input to the engine(s). Moreover, when compared to propeller-driven trainers, jet aircraft often provide different and/or integrated instrumentation packages, such as an attitude direction indicator ("ADI") instead of a traditional artificial horizon and/or a horizontal situation indicator ("HSI") instead of a directional gyro. As well, jet aircraft (and in particular, tactical military jets) often implement a stick instead of a yoke for aileron control, and feature tandem, as opposed to side-by-side seating.

These differences between jet aircraft and the trainers used to train pilots impose significant inefficiencies on the pilot training process. A pilot, after learning the control systems on a trainer, will have to unlearn much of that information when transitioning to a military jet, and will have to learn the new control systems required for piloting jet aircraft. Hence, it would be beneficial to provide control systems in training aircraft that better prepare pilots to transition to jet aircraft. Moreover, because a single type of trainer is often used to train pilots that will go on to fly a variety of jets, it would be beneficial to provide easy configurability of controls, to allow a pilot in training to use control systems similar to those on the aircraft the pilot eventually will fly, while minimizing the cost and inconvenience of providing different control systems in the training aircraft.

There are a variety of flight training systems known in the art. For example, some flight training systems rely relatively more heavily on in-flight training, while others rely more heavily on simulator-based training. Many systems seek to integrate in-flight training with simulator-based training. For example, the Individual Combat Aircrew Debriefing System ("ICADS"), available from Cubic Corporation provides a post-flight review of an in-flight training mission flown by a student. However, a limitation of such systems, even integrated systems, is that they merely allow review of what occurred during the training flight. The generally cannot allow an instructor to review hypothetical situations (e.g., "What if this had happened?" or "What if you had performed this action instead of what you actually did?") other than merely conversing verbally with the student.

BRIEF SUMMARY OF THE INVENTION

Embodiments of the invention, therefore, provide novel aircraft control systems for propeller-driven training aircraft, and methods for their use. In an aspect of some embodiments, a control system might comprise an integrated power control that takes a single power input from the pilot and translates that input into controls for a throttle, a propeller pitch setting, and a fuel/air mixture. In another aspect of some embodiments, a glass cockpit may be provided, with computer displays emulating the instruments of the aircraft for which the pilot is training. Advantageously, this allows a pilot in training to learn, from the beginning, the power controls and/or instrumentation for the aircraft for which the pilot is training, instead of having to learn one power control and instrumentation system, only to later have to learn another system. In a specific embodiment, the instrumentation displays may be reconfigurable, allowing the displays to emulate those of a variety of jet aircraft.

One set of embodiments provides systems, including without limitation control systems for reciprocating engine-powered aircraft. In some cases, the control systems might emulated those of a turbine-powered aircraft. An exemplary system might comprise an integrated power controller and/or a set of one or more computer displays.

The integrated power controller might be configured to accept a single input from a pilot of the reciprocating engine-powered aircraft. Based at least in part on the single input, the integrated power controller might be configured to provide a first control signal to control a throttle setting for at least one engine of the reciprocating engine-powered aircraft, to provide a second control signal to control a propeller pitch setting for at least one propeller of the reciprocating engine-powered aircraft, and/or based at least in part on the single input, provide a third control signal to control a fuel/air mixture setting for at least one engine of the reciprocating engine-powered aircraft.

The set of computer displays might be configurable to emulate a set of instrument gauges (such as analog gauges, digital gauges, computer displays, etc.) used on the turbine-powered aircraft to display a set of information. The set of information might comprise information about an altitude of the reciprocating engine-powered aircraft, information about an attitude of the reciprocating engine-powered aircraft, information about an airspeed of the reciprocating engine-powered aircraft, and/or information about information about a heading of the reciprocating engine-powered aircraft.

The control system might also comprise an actuator, which can be sued to provide directional input for the aircraft. The actuator might be a yoke, a control stick, etc. In some cases, the actuator might be a plurality of actuators, including a yoke and a stick. In other cases, the actuator might be configurable in a first configuration (such as a yoke) and a second configuration (such as a control stick). In some cases, a control stick might be configured, along with a thrust actuator (which might be coupled with the integrated power controller), might be configured in a HOTAS configuration.

Another set of embodiments provides methods, including without limitation methods of emulating a control system for a turbine-powered aircraft. An exemplary method might comprise accepting, (e.g., with an integrated power controller), a single input from a pilot of the reciprocating engine-powered aircraft. The method might further comprise providing, based at least in part on the single input, a first control signal to control a throttle setting for at least one engine of the reciprocating engine-powered aircraft, a second control signal to control a propeller pitch setting for at least one propeller of the reciprocating engine-powered aircraft and/or a third control signal to control a fuel/air mixture setting for at least one engine of the reciprocating engine-powered aircraft. The method might also include displaying, e.g., on a set of one or more computer displays that is configurable to emulate a set of instrument gauges used on the turbine-powered aircraft, a set of information (including, for example, information such as that described above).

Another exemplary method might comprise providing a control system (such as the system described above, for example) and/or installing the control system in a reciprocating engine-powered aircraft.

A particular set of embodiments provides aircraft comprising control systems of the invention, while another set of embodiments provides software programs, including without limitation software programs that can be executed to perform methods of the invention, and/or that can be operated on systems of the invention.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION OF THE INVENTION

Figure 1:
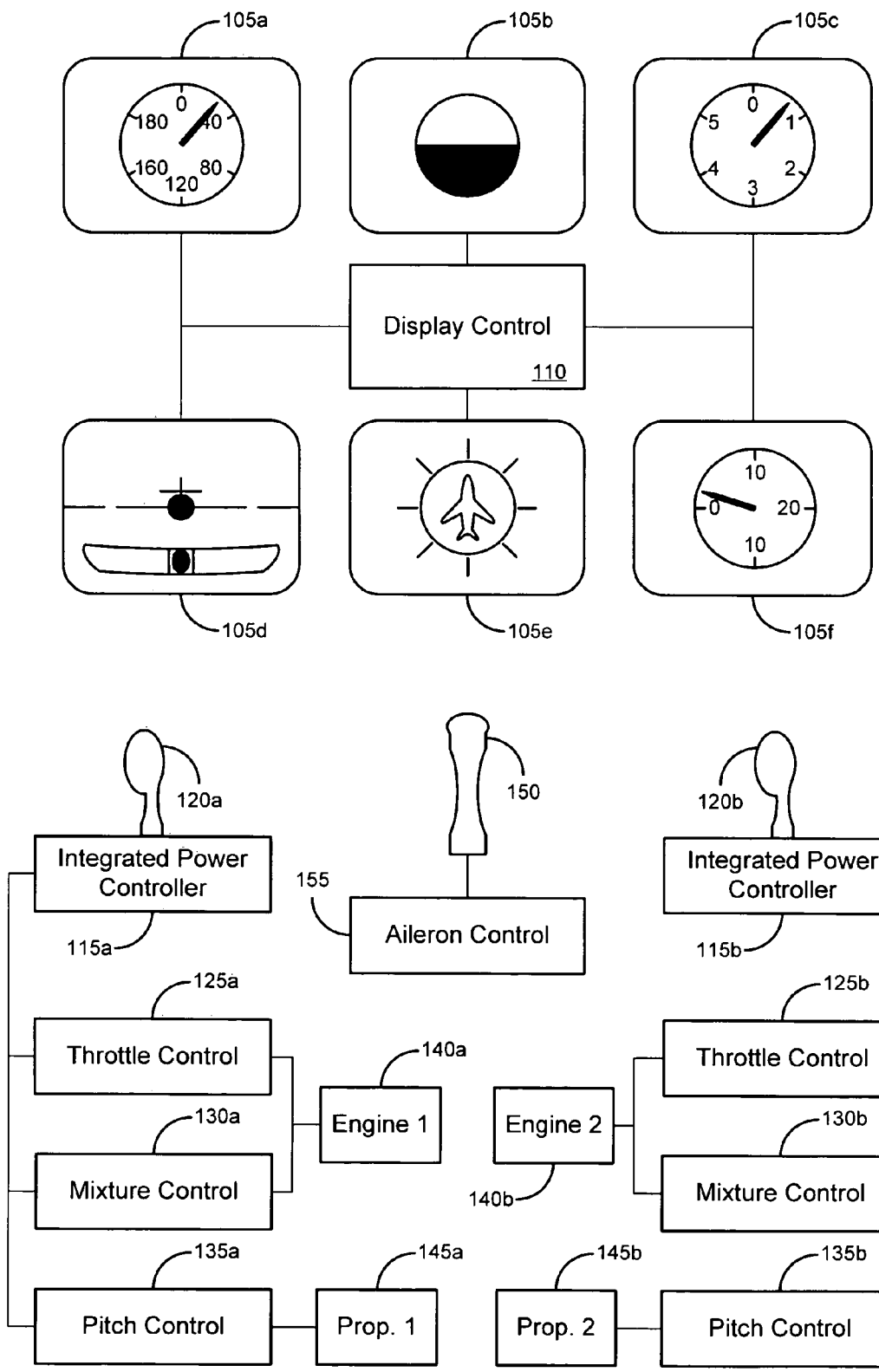
FIG. 1 is a functional diagram illustrating an aircraft control system in accordance with various embodiments of the invention.

Various embodiments of the invention provide novel aircraft control systems, and novel pilot training systems. In an aspect of some embodiments, a reciprocating engine-powered (e.g., propeller-driven) aircraft includes a set of controls that emulate a turbine-powered (i.e., jet) aircraft. Such controls can include power controls (e.g., an integrated power controller that replaces the throttle, fuel/air mixture and propeller pitch controls of a traditional propeller-driven plane) directional controls (e.g., a control stick instead of a yoke) and/or information displays (e.g., displays configurable to emulate the displays used in various jet cockpits) that emulate their counterparts on jet aircraft. Advantageously, this can provide greatly enhanced efficiency in training pilots, as pilots are able to train, in the first instance, using controls emulating those of the jets they ultimately will fly. Moreover, because the controls (including, especially the displays) may be reconfigurable to emulate their counterparts in a variety of jets, embodiments of the invention provide a relatively inexpensive and low-maintenance way to provide diverse training regimens using a single aircraft.

Another set of embodiments provide integrated training systems, which can be used to further enhance the efficiency and efficacy of pilot training programs. Merely by way of example, a training system might be implemented using an aircraft having configurable controls, as described herein. Moreover, in some embodiments, the training system includes an in-flight component and a ground component. The in-flight component can be used to collect and store flight data during a training flight and/or to communicate (e.g., in-flight and/or after the flight has concluded) that flight data to the ground component. The ground component may include a set of pilot controls (which might be similar to the aircraft controls) and, in some cases, can use the flight data to allow the student to "re-fly" a simulation of the training flight. In an aspect of some embodiments, the ground component can receive modified flight data and can alter the simulation accordingly. Hence, for example, if an instructor wishes to show the student what the student should have done during the flight, the instructor can modify the flight data to allow the student to see how the aircraft would have performed had the correct procedures been followed.

Because the simulation of the training flight is dependent on accurate altitude data to faithfully simulate the training flight (for example, during the landing phase of the simulation, if the altitude is inaccurate by a just a few meters, the aircraft will appear either to fly into the ground or to land in mid-air), certain embodiments of the invention provide an altitude measurement correction procedure, which can account for a variety of inputs, including without limitation barometric pressure, GPS-based altitude data, published elevation data for known zero points (such as a runway, etc.) to calculate an accurate altitude above ground at any given point in time. Advantageously, the various inputs might be weighted according to a set of flight characteristics (such as airspeed, groundspeed, attitude, sound pressure level, etc.) at the given point in time. For example, if an airspeed measure indicates 200 knots forward airspeed with a nose-down angle of five degrees, the aircraft is assumed to be in flight, and GPS-based elevation data might be weighted more heavily when recording the altitude value. Conversely, if a fixed-wing aircraft is in a level attitude, with an airspeed below stall speed, the aircraft is assumed to be on the ground, and published elevation data for the plane's location might be weighted more heavily when recording the altitude data. This can provide for improved accuracy of altitude measurements in both high-altitude flight and near-ground operations. In some cases, any correction factors applied to an altitude measurement also may be applied regressively to past measurements, providing increased accuracy across a series of altitude measurements.

Control Systems

As noted above, a set of embodiments provides enhanced control systems. In particular, control systems in accordance with embodiments of the invention are configured for use in training aircraft (and, in particular, for propeller-driven trainers) and/or can be configured to emulate the control systems of one or more jet aircraft. Control systems in accordance with embodiments of the invention can be used with a wide variety of aircraft, including without limitation a variety of existing trainers, such as the Diamond DA-20, Grob 115, Siai Marchetti SF-260, Cessna 172, Piper Warrior, Beechcraft Baron, Piper Seminole, Beechcraft T-34, Enaer T-35, Socata TB-30, and the like. In addition, control systems in accordance with embodiments of the invention may be used with propeller-driven aircraft purpose-built for emulating jet aircraft, and in particular tactical jet aircraft. For example, such an aircraft may have tandem (e.g., pilot in front, navigator, co-pilot or instructor in back) seating, as opposed to the more traditional side-by-side seating arrangements of many light aircraft. As another example, a purpose-built aircraft may be configured with a thrust-to-weight ratio close to that of many jet aircraft than that of most propeller-driven aircraft, and/or other flight characteristics of the aircraft might emulate those of a jet, so that pilots in training can perform more high-performance maneuvers within the flight envelope of the aircraft.

FIG. 1 illustrates a control system 100 in accordance with one set of embodiments. (The layout of the components of the control system 100 is arranged for ease of illustration only. The reader should appreciate that the cockpit layout of the control system 100 may take any appropriate form and often will emulate the cockpit layout of the jet being emulated.) The control system 100 includes, in some embodiments, one or more instrument displays 105 for displaying flight data. Depending on the jet aircraft the control system 100 is designed to emulate, the instrument displays 105 might take a variety of different forms. Merely by way of example, if the control system 100 is designed to emulate a jet trainer, such as a T-6, the instrument displays 105 might be analog gauges similar (or identical) to those in the T-6. Alternatively, if the control system 100 is designed to emulate a commercial jet, such as a 777, the displays might be configurable computer displays (such as CRTs, LCD panels, etc.), including for example, a primary flight display ("PFD"), also referred to as an electronic flight information system ("EFIS"), multifunction display ("MFD"), and/or an engine indications and crew alerting system ("EICAS"). Depending on the aircraft being emulated, a variety of different instrument displays 105 may be used.

In a particular set of embodiments, the instrument display(s) 105 might be general purpose displays configurable by a display control 110. In some embodiments, this can allow the displays to be quickly reconfigured to emulate the control systems of a variety of jet aircraft. Merely by way of example, in a first mode, the displays 105 might be configured to emulate a traditional "six-pack" of analog instrument gauges, including without limitation, an airspeed indicator 105a, an artificial horizon 105b, an altimeter 105c, a turn coordinator 105d, a directional gyro 105e, and a rate-of-climb indicator 105f, to name a few. In a second mode, the displays 105 might be reconfigured to display the PFD, MFD and EICAS to emulate a 777. In a third mode, the displays 105 might be reconfigured to emulate the digital displays (and/or heads-up displays) of an F/A-18 or other tactical jet, including for example, an attitude direction indicator ("ADI") and/or a horizontal situation indicator ("HSI"). In certain configurations, one or more of the displays might be touch-sensitive and/or might be configured to emulate additional avionics controls, such as radio controls, etc., in order to faithfully represent the instrument panel layout of the jet being emulated.

While, for purposes of illustration, FIG. 1 illustrates six digital instrument displays 105a-f, each emulating analog gauges, the number and nature of instrument displays 105 is discretionary and may vary according to the jet aircraft being emulated. In some cases, a single display might emulate more than one instrument. In other cases, not all of the displays may be activated when emulating a cockpit of any particular aircraft. In a set of embodiments, existing components may be used and/or modified to provide the display capabilities described herein. Merely by way of example, the EFIS Lite instrument package available from Blue Mountain Avionics of Copperhill, Tenn. may be used to provide one or more of the instrument displays 105.

As noted above, a display control 110 might be used to configure and/or drive the displays. The display control 110, which might be a general-purpose and/or special-purpose computer, might be configured to interface with a second computer (e.g., via USB connection, Bluetooth connection and/or any other appropriate wired or wireless communication facility) to receive instructions for configuring the displays. Alternatively, the display control 110 might have its own input devices (which could be cockpit switches, dials, etc. and/or more traditional input devices, such as a keyboard, mouse trackball, etc.) to allow for configuration. In some cases, the display control 110 may receive input from appropriate aircraft instruments and/or sensors (such as engine management computers, altimeters, airspeed sensors, etc.) and/or convert that input into display information to be displayed on the appropriate instrument display 105. In other cases (such as when the instrument displays 105 are analog gauges), the display control 110 may be omitted, and/or the instrument displays 105 might themselves receive input directly from the appropriate instruments and/or sensors. In some cases, the instructor pilot or flight instructor could choose to manually "fail" an instrument from his or her control panel, to simulate a "partial panel" condition.

In another set of embodiments, the control system 100 includes one or more integrated power controllers 115, each of which are configured to take a single input from a pilot (such as manipulation of a thrust actuator 120). One skilled in the art will appreciate that a typical propeller-driven aircraft requires three separate power inputs, which must be coordinated according to the flight characteristics at any given time: a throttle setting, a propeller pitch setting, and a fuel/air mixture setting. In a set of embodiments, therefore, the integrated power controller 115, receives the single power input from the pilot and transforms that input into the three separate control signals: a throttle control signal 125, which provides throttle input to the engine 140 (or engine management system, as appropriate), a fuel/air mixture control signal 130, which provides mixture input to the engine 140 (or carburetor, fuel injectors, engine management system, etc. as appropriate), and a pitch control signal 135, which provides pitch input to the propeller 145. In some cases, if the aircraft has multiple engines, there may be an integrated power controller 115a and 115b, for each engine 140a and 140b, and propeller 145a and 145b, respectively.

In a set of embodiments, the integrated power controller 115 is configured to evaluate various flight parameters in determining what input to provide for each the three control signals. Merely by way of example, the integrated power controller 115 might consult an altimeter measurement in determining an appropriate fuel/air mixture. Similarly, in determining a proper propeller pitch, the integrated power controller 115 might analyze the current airspeed, rate of climb, throttle setting and the like. In some embodiments, the integrated power controller might comprise a full authority digital control ("FADEC"), such as the PowerLink FADEC, available from Aerosance, a Teledyne Technologies Company, located in Farmington, Conn.

Using the integrated power controller 115, the pilot can manipulate a single thrust actuator 120 (or, in some cases, a thrust actuator 120 for each engine in a multi-engine craft) to control the thrust provided by the propeller(s) of the aircraft. In this way, the pilot can learn and become familiar with the thrust controls of the jet being emulated, and hence will not have to learn (and then "unlearn") the triple controls common to traditional propeller-driven training aircraft. This leads to increased efficiency in training, as the pilot will not have to learn one of the more complex control relationships that is unique to propeller-driven craft, and which the pilot will never have to use when graduating to a jet aircraft.

If desired, the thrust actuator(s) 120 might be configured aesthetically similarly to those of the jet being emulated by the control system. For example, if the control system 100 is designed to emulate a tactical jet, the thrust actuators 120 might be relatively large and styled in similar fashion. The thrust actuators 120 might also have additional control appropriate for hands-on-throttle-and-stick ("HOTAS") operation. Alternatively, if the control system 100 is designed to emulate a commercial jet, the thrust actuators 120 might be configured to be relatively smaller, in a bank, similar to those common on airliners.

In a set of embodiments, the control system comprises a directional actuator 150 (such as a control stick, yoke, etc.) to provide roll control (e.g., via control 155 of a set of ailerons on the aircraft) and/or pitch control (e.g., via control of a set of elevators and/or a stabilizer). A set of rudder pedals (not shown on FIG. 1) may be provided for yaw control as well. Like the thrust actuator 120, the configuration of the directional actuator 150 might depend on the nature of the aircraft the control system 100 is designed to emulate. Merely by way of example, if the control system 100 is designed to emulate a tactical fighter, the directional actuator 150 might be a control stick, perhaps with additional controls for HOTAS operation. Conversely, if the control system 100 is designed to emulate a commercial jet, the directional actuator 150 might comprise a yoke.

In a set of embodiments, the thrust actuator 120 and/or directional actuator 150 might be designed to be quickly replaced and/or interchanged with alternative models, to allow for relatively seamless conversion between emulation modes. In some cases, there might be provided facilities for a plurality of directional actuators 150 (such as a stick and a yoke), such that the desired actuator can be implemented in the control system, and the other actuator can be removed. To reconfigure the control system 100 from emulating a tactical jet to emulating a commercial jet, for example, the control stick can be removed, and a control yoke provided. In some cases, there may be two directional actuators (e.g., one in a pilot's seat and one in a co-pilot's seat). Optionally, one of the actuators may be of a first type (e.g., a yoke) and the other actuator may be of a second type (e.g., a stick), to provide enhanced versatility.

Figure 2:
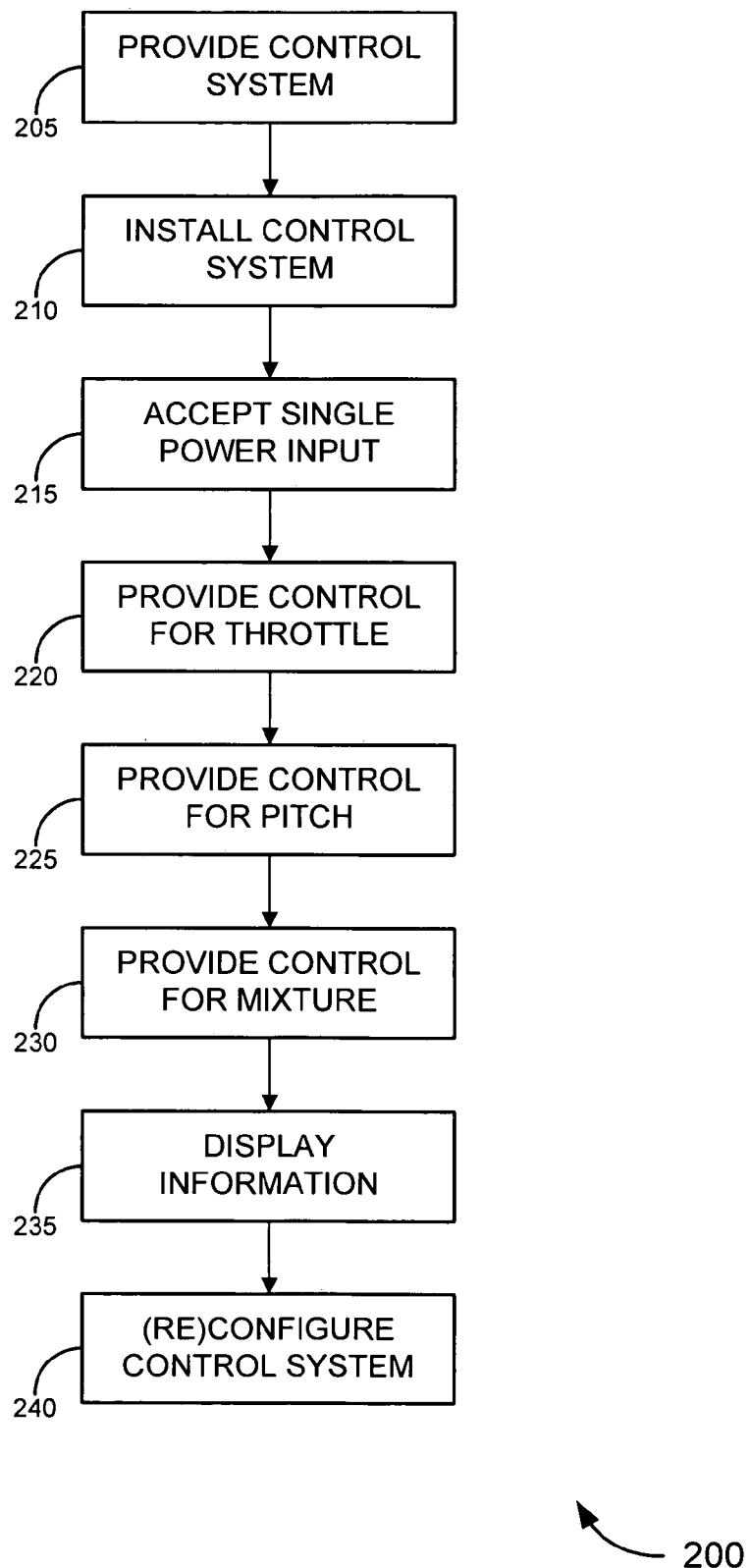
FIG. 2 is a process flow diagram illustrating a method of emulating a jet aircraft with a propeller-driven aircraft, in accordance with various embodiments of the invention.

FIG. 2 illustrates a method 200 of emulating, with a propeller-driven aircraft, the control systems of a turbine-powered aircraft. At block 205, a control system, such as the control system 100 described above with respect to FIG. 1, may be provided, and at block 210, the control system may be installed in a propeller-driven aircraft. Installing the control system can take several forms. Merely by way of example, the control system may be installed in a new aircraft, as part of the construction of that aircraft. (The aircraft can be any suitable model, such as the typical light aircraft described above and/or an aircraft purpose-built to emulate a jet aircraft). Alternatively, installing the control system might comprise retrofitting an existing aircraft with a control system in accordance with embodiments of the invention.

In operation, the control system often will accept a single power input (e.g., at an integrated power controller, as described above) (block 215) from a pilot. Based, at least in part, on the single power input, the control system will then provide a first control signal to control a throttle setting for one or more engines of the aircraft (block 220), provide a second control signal to control a propeller pitch setting for one or more propellers of the aircraft (block 225), and provide a third control signal to control a fuel/air mixture setting for one or more engines of the aircraft (block 230). (As noted above, if the aircraft has multiple engines, a separate integrated power controller may be provided for each engine/propeller pair. Blocks 215-230 can be repeated for each of the integrated power controllers.)

The method 200 can also include displaying a set of information on a set of instrument displays (which might comprise one or more computer displays). In some cases, the set of computer displays may be configurable to emulate a set of instrument gauges used on the jet being emulated. The set of information might comprise, inter alia, information about the aircraft's altitude, attitude, airspeed and/or heading. Other information (such as radio frequency information, waypoint headings, and the like) may be displayed as well. Engine performance information may be displayed on the MFD, the EICAS, and/or a dedicated engine performance display, analogous to the engine displays of a turbine powered aircraft. In this case, the typical reciprocating engine indicators of RPM and manifold pressure might be replaced and/or supplemented by a "percent power" indication (as used with turbine engines). This value could be calculated and displayed, for example, by the integrated power controller (and/or by a component thereof, such as FADEC computer), and/or could be based on measures of values such as the power level position setting, the engine RPM, the manifold pressure, and/or the propeller pitch.

As noted above, in some cases, control systems in accordance with various embodiments may be reconfigurable. Hence, the method 200 can include configuring and/or reconfiguring the control system (block 240), for example, to emulate a particular type of jet aircraft. In some embodiments, configuration and/or reconfiguration of the control system might comprise configuring (e.g., via a display controller) the configuration of the displays to emulate the desired type of jet aircraft. In other embodiments, configuration and/or reconfiguration of the control system might comprise installing and/or replacing the directional and thrust actuators with models similar to those on the emulated aircraft.

Hence, one set of embodiments provides control systems that allow a propeller-driven trainer to emulate the cockpit of one or more turbine-driven aircraft. As described below, in some cases, such control systems can be used within an integrated training system.

Integrated Training System

Another set of embodiment provides integrated systems, methods and software for providing flight training. One set of embodiments may be implemented together with a propeller-driven aircraft having a control system configured to emulate a jet aircraft, such as the systems described above. Embodiments of the invention, however, are not limited to any particular structural implementation, but instead may be used with other aircraft (including, inter alia) more traditional training aircraft as well). Merely by way of example, some embodiments of the invention can be used for training with fixed-wing aircraft, while other embodiments can be used for training with rotary-wing aircraft. (Some embodiments may be used for training with both types of aircraft.)

In a set of embodiments, a training system allows for the collection and storage of flight data during a training flight, usually in a real aircraft (i.e., not a simulation). After the training flight has ended (or perhaps even during the training session), the flight data can be used to construct a replay of the training flight. The student, then, can participate in the simulation debrief and/or critique of the mission by replaying the events that occurred during the flight. This capability might be provided by computer software operating on a PC and/or PDA.

Additionally, after the training flight has ended (or perhaps even during the training session) the flight data can be used to construct a simulation of the training flight. The student, then, can participate in the simulation (e.g., by providing control inputs using simulations of common aircraft controls, such as thrust controls, directional controls (using a stick, yoke and/or rudder pedals), and the like. Using this capability, an instructor (or the student, or another), can provide modified flight data, which can be used to modify the simulation. In this way, for example, an instructor can introduce hypothetical situations into the simulation of the actual flight. This provides several advantages over other models of flight training. Merely by way of example, if the student had trouble with a particular aspect of the training flight (e.g., the student overflew the landing), the instructor could modify the simulation to correct an error at an earlier point in the flight (for instance, in this example, by decreasing the altitude and/or airspeed of the aircraft on approach), to allow the student to re-attempt the maneuver under more satisfactory conditions. As another example, the instructor could introduce additional flight conditions (such as reducing the airspeed to the aircraft's stall speed) to allow the student to "fly" under hypothetical conditions in one aspect of the simulation, with the remainder of the simulation remaining true to the actual flight.

Figure 3:
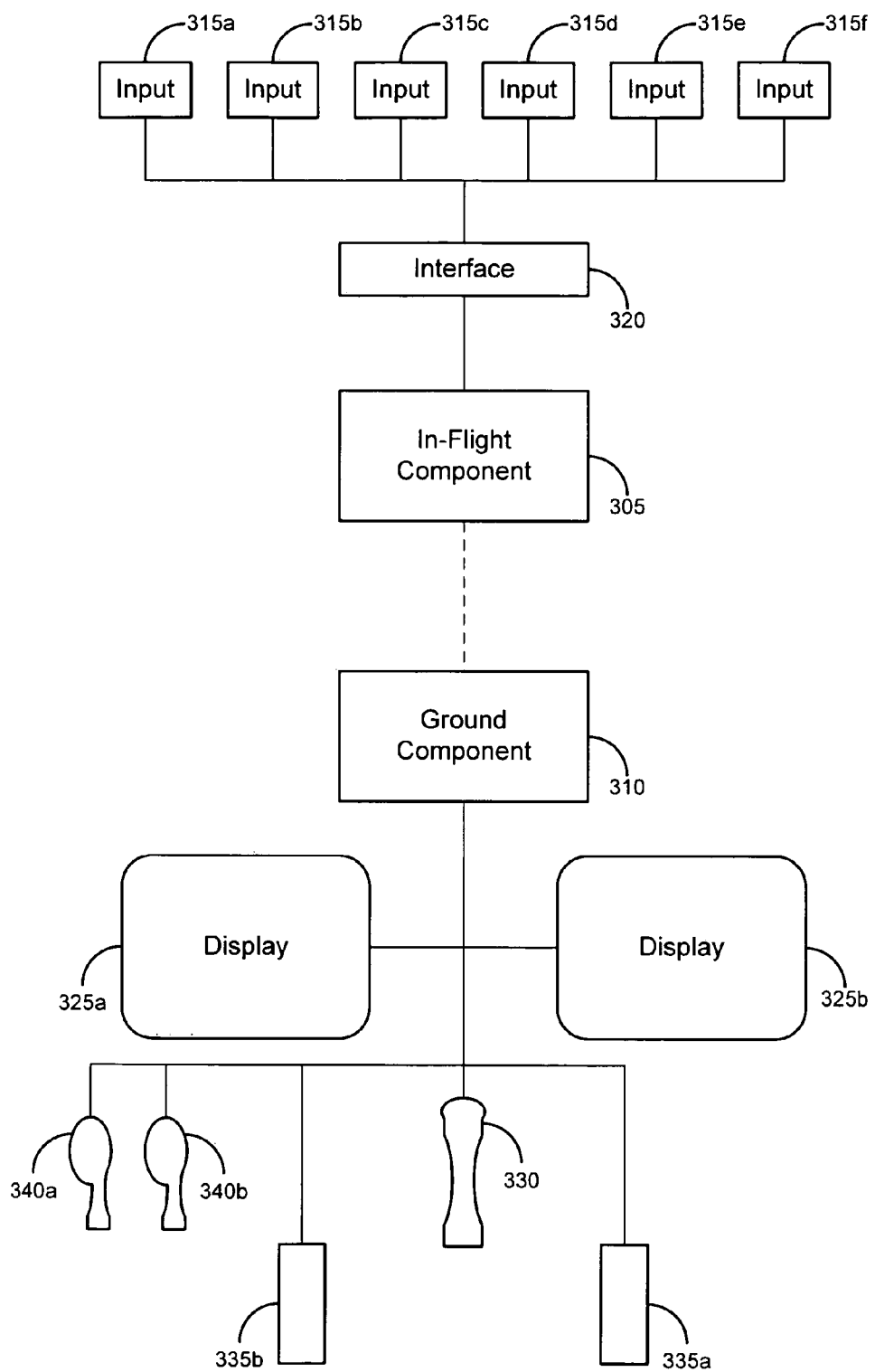
FIG. 3 is a functional diagram illustrating an integrated flight training system, in accordance with various embodiments of the invention.
Figure 4:
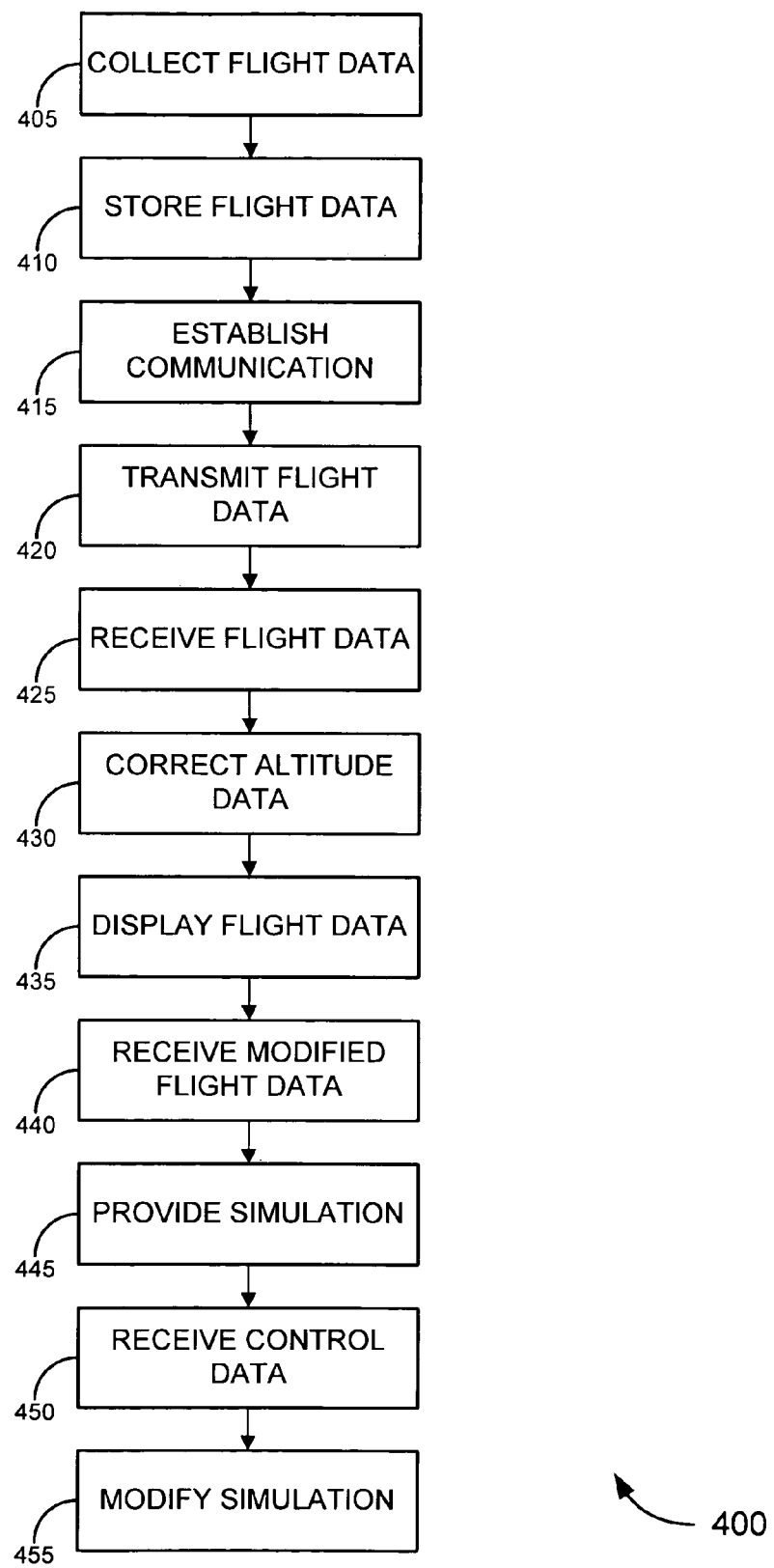
FIG. 4 is process flow diagram illustrating a method of providing flight training, in accordance with various embodiments of the invention.

FIG. 3 illustrates an integrated flight training system 300 in accordance with one set of embodiments. For ease of description, the operation of the system 300, in accordance with one set of embodiments, is described with respect to the method 400 of FIG. 4, although it should be noted that the method 400 is not limited to any particular structural implementation, and can be performed independently of the system 300; conversely, the system 300 can be operated in a manner different than that described by the method 400. The system 300 might include an in-flight component 310 and a ground component 320. (It should be appreciated that the terms "in-flight component" and "ground component" are descriptive, and not limiting, in nature. In certain embodiments, the in-flight component 305 could perform some or all of the functionality of the ground component 310, and/or vice-versa. In fact, both the in-flight component 305 and the ground component 310 could be integrated within a single component.)

In a set of embodiments, both the in-flight component 305 and the ground component 310 are computers, and each may comprise one or more processors, one or more computer readable storage media (such as RAM, optical drives, disk drives, etc.), along with instructions executable by the processor(s) to provide the functionality of the invention. For instance, in a particular embodiment, the in-flight component might be a personal digital assistant ("PDA"), such as a Palm™ device, a Windows Mobile™ Device, a palmtop computer, tablet computer, etc. In this way, the in-flight component can be used to record data while in flight, and then can be removed from the cockpit when the flight is finished. In fact, it can be part of a student's pilot's flight bag. In other embodiments, the in-flight component may be a laptop, a PC and/or a special-purpose computer installed in the aircraft.

Like the in-flight component 305, the ground component 310 may be any suitable computing device. In a set of embodiments, the ground component 310 may be a general purpose computer (such as a PC, workstation, etc.) configured with software (such as flight debriefing and/or simulation software) and/or hardware (such as the controls described below) to perform the functions of the invention. In other embodiments, the ground component 310 may be a special purpose computer; merely by way of example, the ground component 310 may comprise (and/or be incorporated in) a dedicated simulator.

As noted above, the in-flight component is configured, in some embodiments, to collect flight data (block 405). In some embodiments, the in-flight component 305 is in communication with one or more input sources 315, which can include various instruments (such as altimeter, GPS, pilot tube, gyroscope, accelerometer, magnetometer, flight data computer, other avionics, etc.). In some cases (for example, when the in-flight component 305 is a PDA and/or is not purpose-built to collect in-flight data, the in-flight component may receive data from the input sources 315 via an interface 320. Merely by way of example, the interface 320 may be configured to accept input in the form commonly provided by aircraft instruments and/or avionics, and covert that data to a form that can be received by the in-flight component 305 (hence, in some embodiments, the interface 320 might comprise an analog-to-digital converter ("ADC"), if some or all of the data from the input sources 315 is provided as analog data. In a set of embodiments, the interface 320 (and/or the in-flight component 305 itself) may be in communication with, and/or integrated with, a display control (such as the display control 120 described above), since much (and sometimes all) of the flight data collected by the in-flight component 305 will be processed by the display control, assuming the aircraft is equipped with the configurable displays described above.

A wide variety of data may be collected by the in-flight component. Merely by way of example, the in-flight component might collect data about various flight parameters, such as current time, aircraft altitude, heading, ground track angle, attitude (e.g., roll, pitch and/or yaw angle), rate of angular change (in roll, pitch and/or yaw), airspeed, groundspeed, acceleration (longitudinal, lateral and/or vertical), location (which might be described by latitude/longitude components), rate of climb, and/or the like. Additionally and/or alternatively, operating parameters of the aircraft (such as power setting, engine RPM, propeller pitch, manifold pressure, mixture ratio, landing gear status, weight-on-wheels, fuel level, sound pressure level, warning and/or alarm indications, and/or the like) may be collected as well. In a set of embodiments, the set of flight data might comprise a set of free-body time, space and position information ("TSPI"). The sampling rate for the collection of data can vary, and might be dependent on the parameter being collected. The selection of sampling rate involves a balance between the volume of data storage available, the limitations of the instruments and/or collection system, and the desired amount of data. Generally, relatively greater sampling frequencies will produce relatively more faithful simulations. Merely by way of example, some data might be sampled at a frequency of 1, 10 or 100 Hz (different sampling rates may be used for various data), with a collection rate of 10 Hz. (Other sampling and collection rates may be used as well.)

The collected data is stored by the in-flight component (for example, on a storage device, such as RAM, disk drive, flash RAM, etc.) (block 410). In accordance with various embodiments, the storage of the collected flight data can take many forms. Merely by way of example, in some cases, the collected flight data might be stored in a database local to the in-flight component. In other cases, the collected flight data might be stored as a text file. In a particular embodiment, the collected flight data is stored in a format that allows for relatively easy access and/or manipulation by the ground component (as described below, for example). Merely by way of example, any of several standard (e.g., comma-separated-value ("CSV") and/or Distributed Interactive Simulation ("DIS") protocol) and/or proprietary forms may be used.

The in-flight component 305 communicates with the ground component 310. Any suitable mode of communication may be used. Merely by way of example, various forms of wired communications, such as serial connections, USB connections, Ethernet communications, and the like, or wireless communications, such as IEEE 802.11 connections, IEEE 802.16 connections, ZigBee connections, Bluetooth connections, cellular and/or PCS connections, point-to-point microwave communications, proprietary forms of telemetry and/or data link connections, etc, may be used as appropriate. In some cases, the in-flight component 305 may be in substantially continuous communication with the ground component 310 (such as when the ground component 310 is integrated with the in-flight component 305, and/or when the ground component 310 maintains wireless communication with the in-flight component 305). In other cases, the in-flight component 305 may not maintain communication with the ground component 310 while the aircraft is in flight.

In any event, the in-flight component 305 establishes communications with the ground component 310 (block 415) (either before, during and/or after the training flight) and thereafter transmits flight data for reception by the ground component 310 (block 420). The ground component 310 receives the flight data (block 420) and performs any necessary data conversion and/or import functions to allow the ground component 310 to use the data (e.g., to provide a replay (e.g., for debrief and/or critique) and/or simulation, as described above).

In some cases, the ground component 310 (and/or the in-flight component 305) will perform an altitude measurement correction function (block 430), in order to provide more precise and/or accurate altitude data (e.g., to enhance the fidelity of the simulation). For example, in many instances, the training aircraft will be equipped with a GPS receiver which uses multilateration techniques to predict the latitude, longitude and elevation or altitude (Z) of the rover. While latitude and longitude solutions are typically accurate enough, the vertical measurement (Z) is usually degraded because of poor geometry of the aircraft with respect to the constellation of orbiting satellites. During normal flight operations, the relative and absolute accuracy of a low-cost instrumentation system ("LCIS") using a GPS receiver is adequate for most flight training purposes. However, during near-ground or on-ground operations, this accuracy is not sufficient because the aircraft will appear to sink into the ground or hover in the air during the mission replay where terrain information is presented.

In a set of embodiments, the altitude measurement correction function might implement a filter routine (such as a type of Kalman filter, for example) that is configured to identify a known runway elevation, receive altitude data from a global positioning system ("GPS") receiver, and/or calculate, (e.g., from the known runway elevation and the received altitude data, as well perhaps as other data, such as barometric altitude measurements), an actual altitude of the aircraft about ground level at a given point in time, based on a set of flight characteristics at the given point in time. The flight characteristics can include, merely by way of example, the craft's airspeed, groundspeed, roll angle, pitch angle, sound pressure level, etc. Other flight characteristics can include latitude, longitude and/or altitude values (e.g., GPS-based altitude values).

Using these flight characteristics, the correction function can selectively weight the published elevation data for a particular location of the aircraft at a point during the training flight against an altitude calculated from GPS data at that point in time. So, for example, if the flight characteristics indicate a high probability that the aircraft is on the ground (e.g., airspeed, pitch and roll angles of zero for a fixed-wing aircraft, and/or a relatively low sound pressure level for a rotary wing aircraft), the published elevation data will be given predominant weight in determining the corrected altitude. Conversely, if the flight characteristics indicate a high probability that the aircraft in the air, the GPS-based altitude might be weighted relatively more heavily.

In some embodiments, when the aircraft is on the ground, the published elevation data (which might be obtained, for example, by querying a terrain database to look-up the published elevation associated with the measured latitude and longitude) might be compared with a barometric altitude measurement, and that barometric measurement might be used to provide correction factors to GPS-based data while in flight. Accordingly, the corrected altitude data obtained with the aircraft is on the ground can be used regressively (either backward and/or forward in time) to correct GPS-based measurements of altitude data at other points in the training flight. This may be performed, for example, by the ground component 310, as part of a smoothing routine before simulating the training flight (which can, for example, eliminate discontinuities in altitude data which might be disruptive during the simulation).

In some cases, the flight data might be displayed for the student, an instructor and/or another (block 435). The flight data might be displayed in tabular format, for example. Alternatively and/or additionally, the flight data might be displayed by displaying a static view of the aircraft at one or more points during the training flight. Other methods of displaying the flight data are possible as well, and a user may be given the option of how (and for which points during the training flight) to display the flight data. This can offer the opportunity for the user to modify the flight data (for example, by manipulating the static image of the aircraft, by editing tabulated data, etc.). This modified flight data might be received by the ground component (block 440), so that, for example, it can be incorporated into the simulation as described below.

At block 445, a simulation of the training flight is provided. The ground component 310 might be in communication (and/or incorporate) one or more displays 325 (which can be similar to the displays 105 of the control system illustrated by FIG. 1 and/or can include one or more displays for displaying views of the simulation—such as a view from the cockpit, external views of the aircraft from various angles and the like—many of which are familiar to users of flight simulators). Alternatively and/or additionally, the ground component 310 might include a set of controls (which may emulate and/or be similar to the controls in the aircraft), including without limitation one or more directional actuators 330, rudder pedals 335 and/or thrust actuators 340. Hence, one or more of the displays 325 can be used to provide a simulation (including one or more cockpit window views, external views and/or instrument views) of the training flight. Furthermore, in some cases, the method may include receiving a set of control data from the set of controls (block 450), for example, to allow the student (or another) to participate in the simulation by taking control of the simulated aircraft and "re-flying" the training flight.

In some cases, the modified flight data can be used to modify the simulation (block 455). Merely by way of example, in some cases, an instructor might modify the flight data to put the aircraft into a different set of circumstances (perhaps an emergency situation) than actually occurred during the training flight, and require the student to fly the simulated aircraft under those circumstances. Alternatively and/or additionally, the instruction might modify the simulation by correcting an error made by the student, and allowing the student to see the result of the error correction (or participate in a simulation of what would have happened had the student not made the error).

CONCLUSION

Figure 5:
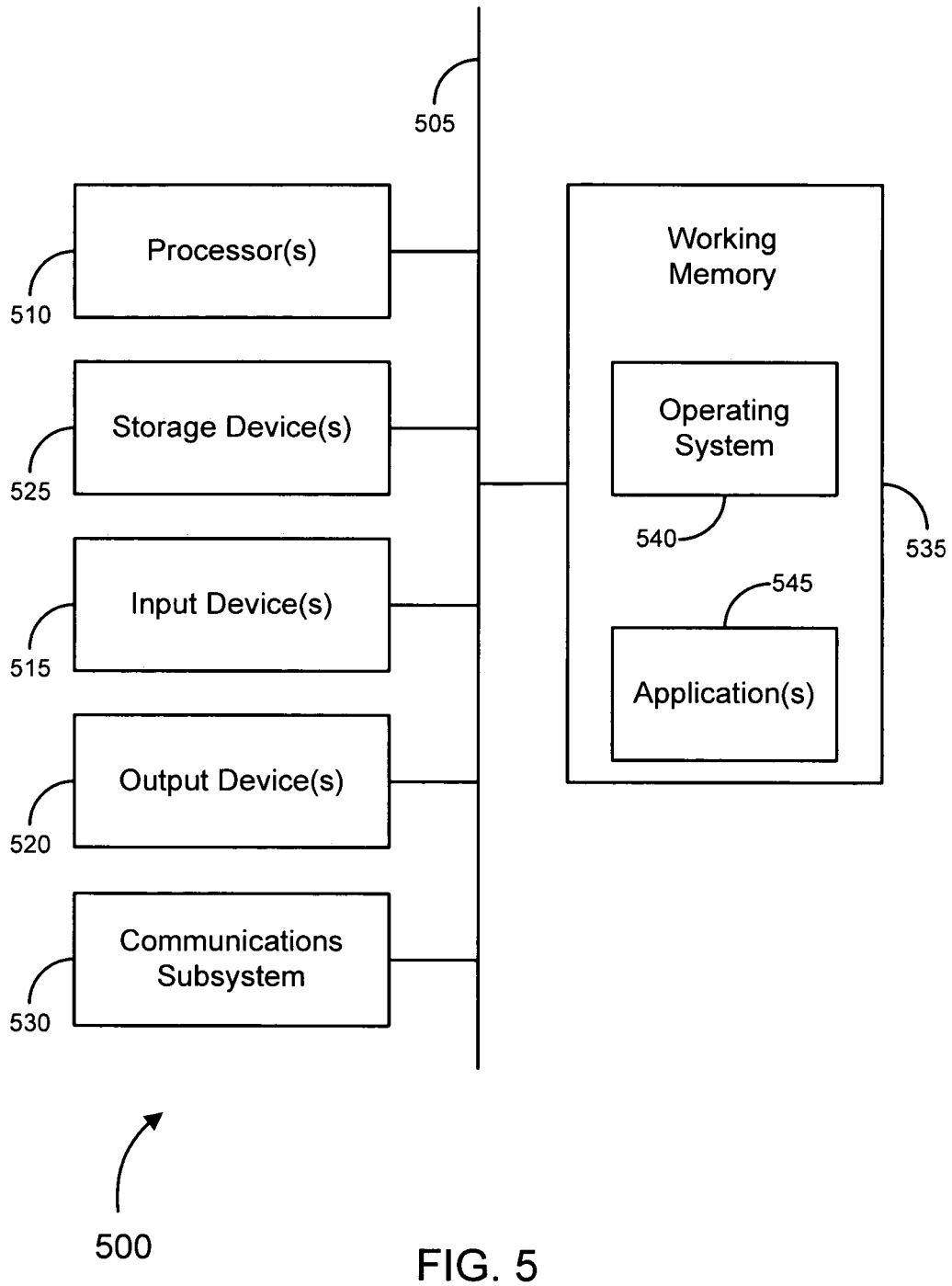
FIG. 5 is a generalized schematic diagram illustrating a computer system that can be used in accordance with various embodiments of the invention.

Embodiments of the invention thus provide, inter alia, novel control systems and training systems for aircraft, as well as methods of implementing such systems. As described above, some embodiments of the invention implement one or more computer systems. FIG. 5 provides a generalized schematic illustration of one embodiment of a computer system 500 that can perform the methods of the invention and/or the functions of computer, such as the computers described above. FIG. 5 is meant only to provide a generalized illustration of various components, any of which may be utilized as appropriate. The computer system 500 can include hardware components that can be coupled electrically via a bus 505, including one or more processors 510; one or more storage devices 515, which can include without limitation a disk drive, an optical storage device, solid-state storage device such as a random access memory ("RAM") and/or a read-only memory ("ROM"), which can be programmable, flash-updateable and/or the like (and which can function as a data store, as described above). Also in communication with the bus 505 can be one or more input devices 520, which can include without limitation a mouse, a keyboard and/or the like; one or more output devices 525, which can include without limitation a display device, a printer and/or the like; and a communications subsystem 530; which can include without limitation a modem, a network card (wireless or wired), an infra-red communication device, and/or the like).

The computer system 500 also can comprise software elements, shown as being currently located within a working memory 535, including an operating system 540 and/or other code 545, such as an application program as described above and/or designed to implement methods of the invention. Those skilled in the art will appreciate that substantial variations may be made in accordance with specific embodiments and/or requirements. For example, customized hardware might also be used, and/or particular elements might be implemented in hardware, software (including portable software, such as applets), or both.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A control system for in-flight use in a reciprocating engine-powered aircraft, the control system emulating that of a turbine-powered aircraft, the control system comprising:
    an integrated power controller configured for use in a reciprocating engine-powered aircraft while the aircraft is in flight and further configured to:

(a) accept a single input from a pilot of the reciprocating engine-powered aircraft;

(b) based at least in part on the single input, provide a first control signal to control a throttle setting for at least one engine of the reciprocating engine-powered aircraft;

(c) based at least in part on the single input, provide a second control signal to control a propeller pitch setting for at least one propeller of the reciprocating engine-powered aircraft; and (d) based at least in part on the single input, provide a third control signal to control a fuel/air mixture setting for at least one engine of the reciprocating engine-powered aircraft; and a set of one or more computer displays that is configurable to emulate a set of instrument gauges used on the turbine-powered aircraft to display a set of information, the set of information comprising:

(a) information about an altitude of the reciprocating engine-powered aircraft;

(b) information about an attitude of the reciprocating engine-powered aircraft;

(c) information about an airspeed of the reciprocating engine-powered aircraft; and (d) information about a heading of the reciprocating engine-powered aircraft.

2. A control system as recited by claim 1, wherein the set of information displayed by the set of one or more computer displays further comprises performance information about at least one engine of the reciprocating engine-powered aircraft.

3. A control system as recited by claim 2, wherein the performance engine is displayed as a percentage of maximum performance.

4. A control system as recited by claim 1, wherein:

the reciprocating engine-powered aircraft comprises a plurality of engines, comprising a first engine and a second engine, and a plurality of propellers, comprising a first propeller and a second propeller;

the integrated power controller is a first integrated power controller configured to:

(a) accept a first single input from a pilot of the reciprocating engine-powered aircraft;

(b) based at least in part on the first single input, provide a first control signal to control a throttle setting for the first engine of the reciprocating engine-powered aircraft;

(c) based at least in part on the first single input, provide a second control signal to control a propeller pitch setting for the first propeller of the reciprocating engine-powered aircraft; and (d) based at least in part on the first single input, provide a third control signal to control a fuel/air mixture setting for the first engine of the reciprocating engine-powered aircraft; and the control system comprises a second integrated power controller configured to:

(a) accept a second single input from a pilot of the reciprocating engine-powered aircraft;

(b) based at least in part on the second single input, provide a fourth control signal to control a throttle setting for the second engine of the reciprocating engine-powered aircraft;

(c) based at least in part on the second single input, provide a fifth control signal to control a propeller pitch setting for the second propeller of the reciprocating engine-powered aircraft; and (d) based at least in part on the second single input, provide a sixth control signal to control a fuel/air mixture setting for the second engine of the reciprocating engine-powered aircraft.

5. A control system as recited by claim 1, further comprising an actuator configured to provide directional input for the reciprocating engine-powered aircraft.

6. A control system as recited by claim 5, wherein the actuator comprises a control stick.

7. A control system as recited by claim 6, further comprising a thrust actuator coupled with the integrated power controller, wherein the control stick and the thrust actuator are configured in a hands-on-throttle-and-stick ("HOTAS") configuration.

8. A control system as recited by claim 5, wherein the actuator comprises a yoke.

9. A control system as recited by claim 5, wherein the actuator can be configured in a first configuration and a second configuration, the first configuration comprising a yoke and the second configuration comprising a control stick.

10. A control system as recited by claim 5, wherein the actuator is a plurality of actuators, including a first actuator comprising a yoke and a second actuator comprising a control stick.

11. A control system as recited by claim 1, wherein the set of one or more computer displays is configurable to emulate a plurality of sets of instrument gauges corresponding to a plurality of types of turbine-powered aircraft.

12. A control system as recited by claim 1, wherein the set of one or more computer displays is configured to emulate a set of analog gauges.

13. A control system as recited by claim 12, wherein the set of analog gauges comprises an artificial horizon indicator, a directional gyroscope indicator, an airspeed indicator, and an altitude indicator.

14. A control system as recited by claim 1, wherein the set of one or more computer displays is configured to emulate a set of digital instruments.

15. A control system as recited by claim 14, wherein the set of digital instruments comprises a horizontal situation indicator ("HSI") and an attitude direction indicator ("ADI").

16. A control system as recited by claim 14, wherein the set of digital instruments comprises an electronic flight information system ("EFIS").

17. A control system as recited by claim 1, wherein the reciprocating engine-powered aircraft comprises a tandem seating configuration.

18. A control system as recited by claim 1, wherein the reciprocating engine-powered aircraft comprises a side-by-side seating configuration.

19. In a reciprocating-engine powered aircraft, a method of emulating a control system for a turbine-powered aircraft, the method comprising:

accepting, with an integrated power controller, a single input from a pilot of the reciprocating engine-powered aircraft while the reciprocating-engine powered aircraft is in flight;

providing, based at least in part on the single input, a first control signal to control a throttle setting for at least one engine of the reciprocating engine-powered aircraft;

providing, based at least in part on the single input, a second control signal to control a propeller pitch setting for at least one propeller of the reciprocating engine-powered aircraft;

providing, based at least in part on the single input, a third control signal to control a fuel/air mixture setting for at least one engine of the reciprocating engine-powered aircraft; and displaying, on a set of one or more computer displays that is configurable to emulate a set of instrument gauges used on the turbine-powered aircraft, a set of information comprising:
(i) information about an altitude of the reciprocating engine-powered aircraft;
(ii) information about an attitude of the reciprocating engine-powered aircraft;
(iii) information about an airspeed of the reciprocating engine-powered aircraft; and
(iv) information about a heading of the reciprocating engine-powered aircraft.

20. A control system for a reciprocating engine-powered aircraft, the control system emulating that of a turbine-powered aircraft, the control system comprising:
means for accepting a single input from a pilot of the reciprocating engine-powered aircraft while the reciprocating engine-powered aircraft is in flight;
means for providing, based at least in part on the single input, a first control signal to control a throttle setting for at least one engine of the reciprocating engine-powered aircraft;
means for providing, based at least in part on the single input, a second control signal to control a propeller pitch setting for at least one propeller of the reciprocating engine-powered aircraft;
means for providing, based at least in part on the single input, a third control signal to control a fuel/air mixture setting for at least one engine of the reciprocating engine-powered aircraft; and
means for emulating a set of instrument gauges used on the turbine-powered aircraft to display a set of information comprising:
(i) information about an altitude of the reciprocating engine-powered aircraft;
(ii) information about an attitude of the reciprocating engine-powered aircraft;
(iii) information about an airspeed of the reciprocating engine-powered aircraft; and
(iv) information about a heading of the reciprocating engine-powered aircraft.

21. A method, comprising:
providing a control system configured to emulate a turbine-powered aircraft, the control system comprising:
(a) an integrated power controller, the integrated power controller being configured for use in a reciprocating engine-powered aircraft while the aircraft is in flight and further configured to:
(i) accept a single input from a pilot of the reciprocating engine-powered aircraft;
(ii) based at least in part on the single input, provide a first control signal to control a throttle setting for at least one engine of the reciprocating engine-powered aircraft;
(iii) based at least in part on the single input, provide a second control signal to control a propeller pitch setting for at least one propeller of the reciprocating engine-powered aircraft;
(iv) based at least in part on the single input, provide a third control signal to control a fuel/air mixture setting for at least one engine of the reciprocating engine-powered aircraft; and
(b) a set of one or more computer displays that is configurable to emulate a set of instrument gauges used on the turbine-powered aircraft to display a set of information, the set of information comprising:
(i) information about an altitude of the reciprocating engine-powered aircraft;
(ii) information about an attitude of the reciprocating engine-powered aircraft;
(iii) information about an airspeed of the reciprocating engine-powered aircraft; and
(iv) information about a heading of the reciprocating engine-powered aircraft; and
installing the control system in a reciprocating engine-powered aircraft.

22. A reciprocating engine powered aircraft comprising a control system configured to emulate a turbine-powered aircraft while the reciprocating engine powered aircraft is in flight, the control system comprising:
an integrated power controller operable with the reciprocating engine powered aircraft while the aircraft is in flight, the integrated power controller being configured to:
(a) accept a single input from a pilot of the reciprocating engine-powered aircraft;
(b) based at least in part on the single input, provide a first control signal to control a throttle setting for at least one engine of the reciprocating engine-powered aircraft;
(c) based at least in part on the single input, provide a second control signal to control a propeller pitch setting for at least one propeller of the reciprocating engine-powered aircraft;
(d) based at least in part on the single input, provide a third control signal to control a fuel/air mixture setting for at least one engine of the reciprocating engine-powered aircraft; and
a set of one or more computer displays that is configurable to emulate a set of instrument gauges used on the turbine-powered aircraft to display a set of information, the set of information comprising:
(a) information about an altitude of the reciprocating engine-powered aircraft;
(b) information about an attitude of the reciprocating engine-powered aircraft;
(c) information about an airspeed of the reciprocating engine-powered aircraft; and
(d) information about a heading of the reciprocating engine-powered aircraft.

* * * * *